Oct. 8, 1940.    I. E. SIQVELAND    2,217,237

DENTAL FILLING MATRIX AND METHOD

Filed Nov. 15, 1937

INVENTOR.
IVAR E. SIQVELAND.
BY
ATTORNEYS.

Patented Oct. 8, 1940

2,217,237

UNITED STATES PATENT OFFICE 2,217,237

DENTAL FILLING MATRIX AND METHOD

Ivar E. Siqveland, St. Paul, Minn.

Application November 15, 1937, Serial No. 174,624

2 Claims. (Cl. 32—63)

The present invention relates to a method of filling dental cavities, and is particularly adapted to the filling of gingival cavities, or in other words, cavities which extend below the free margins of the gums.

It is well known to the detal profession that cavities which extend below the free margins of the gums are very difficult to fill properly, due to the fact that in preparing the field of the cavity, the gums are frequently injured, causing bleeding. Also, due to the presence of tissue overlying the cavity, it is very difficult to keep the field dry while inserting the filling, and to restore the true anatomical contour of the tooth after the filling is in place.

An object of the present invention is to make an improved matrix adapted for forming a dental cavity filling.

Another object is to make an improved and simplified dental matrix.

Another object is to make a dental matrix adapted to cooperate with a clamping device to mold a plastic dental filling in situ.

Another object is to provide an improved method for filling a dental cavity.

In order to attain these objects there is provided, in accordance with one feature of the invention, a matrix adapted to be shaped to a tooth, said matrix having a portion thereof adapted to overlie the opposite side of the tooth from that having the cavity, and of clamping the matrix with an impression formed therein over a cavity filled with plastic filling material to shape the plastic filling to a true anatomical contour with respect to the remainder of the tooth, and to extrude any excess filling material beyond the margin of the cavity.

These and other features of the invention will be more fully set forth in the following description and in the accompanying drawing, wherein, Figures 1, 2, and 3 are plan views of three different sizes of dental matrixes for forming to a tooth contour.

Figure 1:
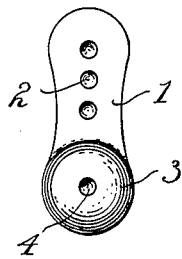
Figure 2:
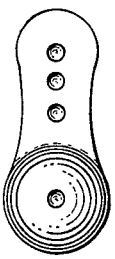
Figure 3:
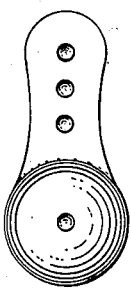
Figure 4:
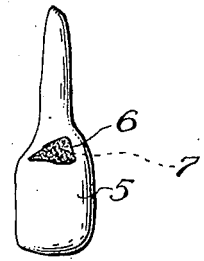
Figure 4 is a view in side elevation of a tooth having a cavity therein at the free margin of the gum.

Referring to the drawing in detail, matrices are formed in three different sizes of the approximate relative dimensions shown in Figures 1, 2 and 3, respectively. The matrix comprises a tongue portion 1 of sheet metal having a plurality of indentions 2 therein, and a portion 3, formed in the shape of a spherical cup having an indention 4 centrally thereof. A tooth 5 is illustrated having a cavity 6 therein, the gum margin being indicated by the dotted line 7 in Figure 4. A clamp 8 is adapted to be used with the matrix holder shown in Figures 1, 2 and 3, respectively, and comprises a hooked member 9 having an arcuately curved end portion 10 with the point 11 shaped to engage the depression 2 or the depression 4 in the matrix holder, depending upon the location of the cavity in the tooth to be filled. A tubular handle member 12 is provided, having a prong 13 extending laterally therefrom with a curved pointed end portion 14 adapted to engage the depression 2 or 4 opposite to that engaged by the portion 11. An outer portion 15 of the member 9 is threaded to receive a thumb screw 16 by means of which the portions 11 and 14 are forced into clamping engagement with the matrix.

Figure 5:
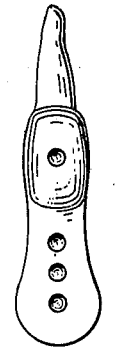
Figure 5 is a view similar to Figure 4 with a matrix similar to that shown in Figures 1, 2, and 3, said matrix being deformed laterally to coincide with the shape of the tooth.
Figure 6:
Figure 6 is a view in perspective of a matrix with a mold impression formed therein.

In practicing the invention the proper size of matrix for the tooth to be filled is selected, and this may readily be estimated by holding a matrix over the tooth to be filled. After the proper matrix is selected, the sides of the matrix are squeezed together between the fingers of the operator to the approximate shape shown in Figure 5 to fit the tooth.

An impression is then taken of the tooth with the cavity therein before any preparation of the cavity is begun. This is done by dropping a small quantity of hot molding compound into the matrix, using the tongue portion 1 of the matrix as a handle. While the molding compound is still soft the matrix is pressed against the tooth, squeezing it well into place with the fingers and making sure that the matrix fits well under the gum line so as to avoid injury to the tissue. If the cavity is shallow, the impression of the cavity may then be cleaned away from the face of the mold with a suitable instrument to restore the anatomical contour of the mold. If the cavity is a large one, it is advisable to fill the cavity with a plaster filling, thereby restoring the anatomical contour of the face of the tooth before taking the impression.

After the impression has been taken the cavity is then prepared as required. The field is then dried in the usual manner and a synthetic filling is mixed and the cavity is filled with an excess quantity of the prepared filling material.

Figure 7:
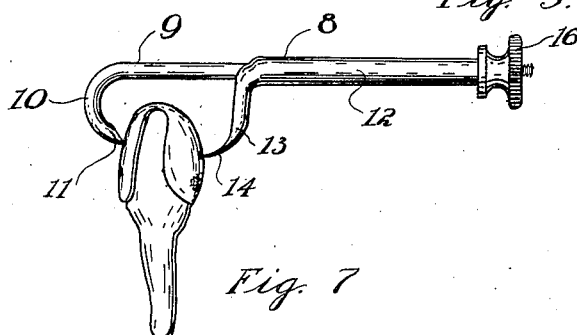
Figure 7 is a view in side elevation of a matrix clamped to a tooth, a special clamp being illustrated.
Figure 8:
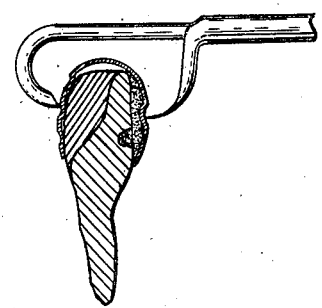
Figure 8 is a longitudinal sectional view through the parts shown in Figure 7 a portion of the handle of a clamp device being broken away, and, Figures 9, 10 and 11 are views in side elevation of a threaded clamp hook member, a socket clamp prong member and a tightening nut, respectively.
Figures 9, 10:
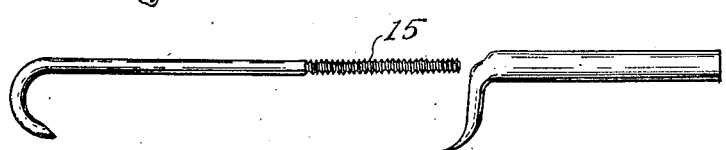
Figure 11:

The face of the mold is then smeared with a thin film of cocoa butter and a small quantity of the filling material is placed over the face of the mold. A small piece of carding wax is then placed over the back of the tooth and after the matrix has been squeezed in place over the face of the tooth containing the cavity, the tongue portion 1 of the matrix is bent over the top of the tooth. The clamp 8 is then placed over the matrix holder as shown in Figure 7, and the thumb screw 16 is tightened so as to apply a considerable amount of force to squeeze the excess filling material out around the sides of the matrix. As the excess filling material is forced outwardly by this action it carries away any moisture that may be near the margin of the cavity.

After the filling compound has set, the matrix is removed and the thin film of filling material remaining on the face of the tooth is removed and the filling is complete. A filling made in this manner requires no subsequent operations whatever and coincides with the true anatomical structure of the tooth.

Although the present technique was designed primarily for gingival cavities, the practice can be followed for the restoration of any part of the tooth destroyed by decay.

I claim:

1. A dental matrix comprising a cup portion of sheet material laterally deformable to accommodate a face of varying types of teeth, said matrix having an integrally formed tongue portion bendable at any point to overlie the top and opposite face of a tooth, said tongue and said cup portion each having a depression therein to receive a clamping device to clamp the matrix into close contact with the face of a tooth to form filling material in a cavity in said tooth.

2. A dental matrix comprising a cup portion of sheet material laterally deformable to accommodate a face of varying types of teeth, said matrix having an integrally formed tongue portion bendable at any point to overlie the top and opposite face of a tooth, said cup portion having a depression substantially centrally thereof to receive one point of a clamping device and said tongue portion having a plurality of depressions spaced throughout its length to receive an opposite point of a clamping device, to position said matrix on a tooth to form filling material in a cavity in said tooth.

IVAR E. SIQVELAND.